(12) United States Patent
Seamans

(10) Patent No.: US 6,832,349 B1
(45) Date of Patent: Dec. 14, 2004

(54) REMOTE ACTIVATION OF ENHANCED FUNCTIONALITY FEATURES IN LOCALLY CREATED DOCUMENTS

(75) Inventor: Mark W. Seamans, Solana Beach, CA (US)

(73) Assignee: Cardiff Software, Inc., Vista, CA (US)

(*) Notice: Subject to any disclaimer, the term of this patent is extended or adjusted under 35 U.S.C. 154(b) by 563 days.

(21) Appl. No.: 09/941,173

(22) Filed: Aug. 27, 2001

Related U.S. Application Data

(60) Provisional application No. 60/260,319, filed on Jan. 8, 2001.

(51) Int. Cl.[7] .......................... G06F 17/00; G06F 15/00
(52) U.S. Cl. .......................... 715/500; 707/10; 715/513
(58) Field of Search ................................ 715/500, 514, 715/513, 512, 501.1, 505; 707/3, 10, 5

(56) References Cited

U.S. PATENT DOCUMENTS

| | | | | |
|---|---|---|---|---|
| 5,442,541 A | | 8/1995 | Hube et al. ................... 700/9 |
| 5,794,236 A | * | 8/1998 | Mehrle ........................... 707/5 |
| 5,933,829 A | * | 8/1999 | Durst et al. .................... 707/10 |
| 6,111,953 A | * | 8/2000 | Walker et al. ................ 380/51 |
| 6,138,237 A | | 10/2000 | Ruben et al. ................ 713/200 |
| 6,356,923 B1 | * | 3/2002 | Yano et al. .................. 717/127 |

* cited by examiner

Primary Examiner—Sanjiv Shah
(74) Attorney, Agent, or Firm—Knobbe Martens Olson & Bear, LLP

(57) ABSTRACT

A method and system for remotely activating document features in locally created electronic documents. Documents having certain document features, are created in a design application at a local computer. Codes correlating to the imparted document features are generated and embedded in the document file. Documents are delivered to a remote computer having a viewer application for opening and viewing the document. The viewer application reads the generated codes and unlocks functionality in the application for implementation of document features. The document features may provide enhanced functionality as value-added items such as digital signature capability, the ability to view a document in high fidelity, and local saving of the document with associated document data.

26 Claims, 6 Drawing Sheets

Base Software Application

Target Application

Figure 1 - Overview

Figure 2 - Base Software Application

Figure 3 - String Representation

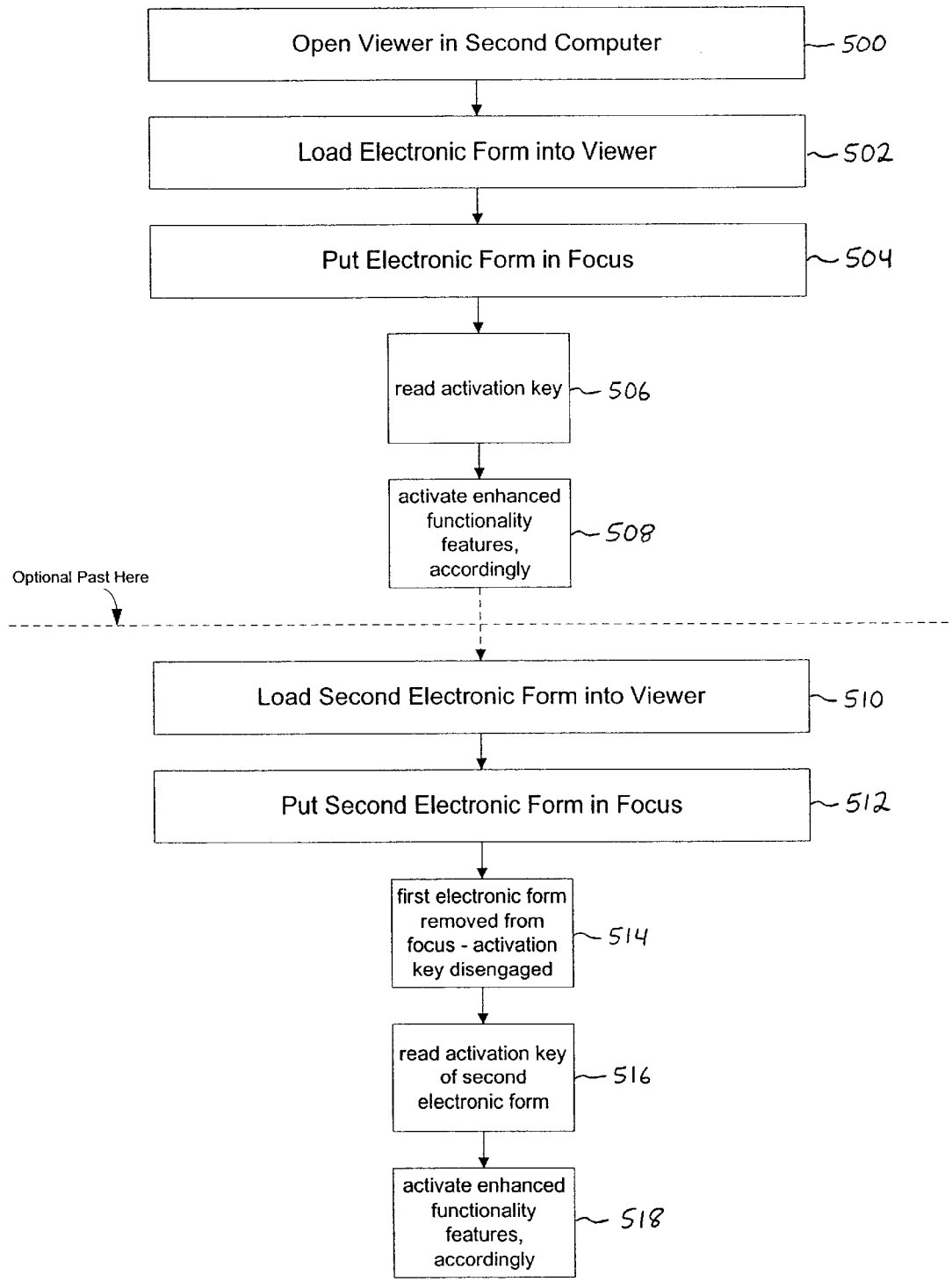
Figure 5 - Target Application

Two Electronic Forms Loaded into Viewer:
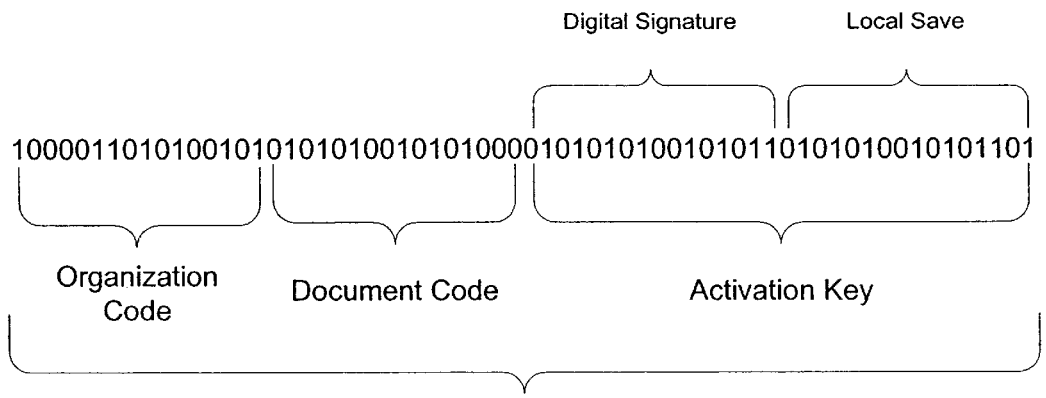
First Electronic Form in Focus: Digital Signature activated, Local Save not activated
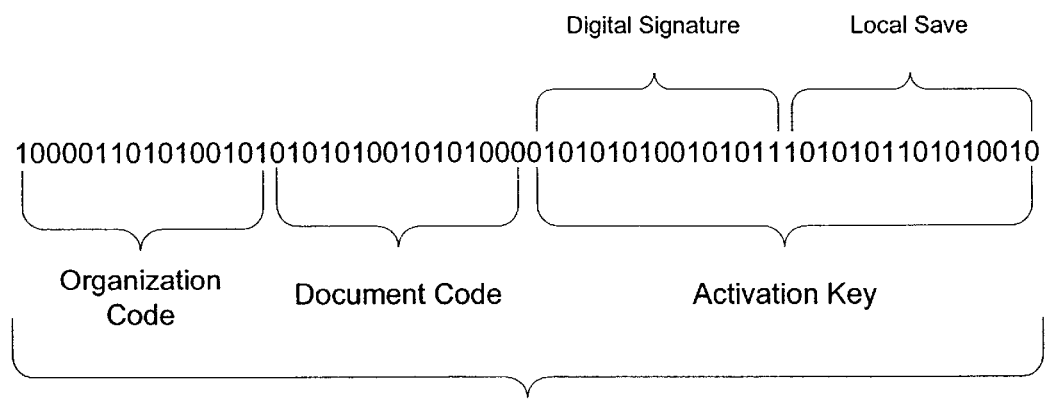
Second Electronic Form in Focus: Digital Signature re-activated, Local Save activated
Figure 6 - in Focus

REMOTE ACTIVATION OF ENHANCED FUNCTIONALITY FEATURES IN LOCALLY CREATED DOCUMENTS

CROSS-REFERENCE TO RELATED APPLICATIONS

This application claims the benefit of the filing date of U.S. patent application Ser. No. 60/260,319, entitled "Remote Activation of Enhanced Functionality Features in Locally Created Digital Documents" filed on Jan. 8, 2001.

BACKGROUND

1. Field of the Invention

Aspects of the present invention relate generally to a method and system for providing effective, network-based transactions. More specifically, embodiments of the present invention relate to a method and system to remotely activate enhanced functionality in a viewer application using a viewed document.

2. Description of Related Technology

Network-based transactions have lent greater productivity to the business world. With network-based systems, namely the Internet, businesses and organizations are now able to optimize their transaction capabilities by conducting transactions with their clients and customers online. Transactions that were previously performed in person or through the mail are now routinely done over the Internet in an automated and more efficient manner. However, certain types of transactions cannot be performed or, at least, cannot be completely performed over the Internet. That is because certain transactions require the need for some type of enhanced functionality and such enhanced functionality cannot be reasonably included in the process.

Consider the annual tax forms distributed by the Internal Revenue Service (IRS) each year to collect taxes. This task is performed by a paper-based system that requires the taxpayer to obtain a form, complete it, sign it and send the form back to the IRS. The efficiency of performing each of these tasks could be increased if this paper-based system were converted to a network-based system. With a network-based system, once an electronic form is created and stored on a central server, it is made accessible to the public. Therefore, the need to reproduce, distribute and store voluminous amounts of paper is eliminated. Processing of the electronic forms is also made easier. Data from the electronic form is more easily extracted when entered as electronic text into an electronic form than when it is extracted from paper-based documents that contain the taxpayer's writings. Thus, if electronic forms were made available over the Internet, a forms processing application could be used for completing and submitting the completed electronic form back to the IRS with many of the inefficiencies eliminated. The problem in this example is that tax forms require the signature of the taxpayer. The problem does not arise from the fact that signatures are performed by hand on paper. Digital signatures have been recognized by the Federal Legislature for their reliability and have been given legal acceptability per The Electronic Signatures in Global and National Commerce Act. However, forms processing applications are typically unable to provide this enhanced functionality to a large segment of people at a cost that makes the process a reasonable endeavor. The reasons are related to the architecture of the forms processing application.

The electronic form is created using a base software application that, includes an electronic document design application, which in this instance is a form design application; but another application, which is essentially an enhanced viewer (viewer), is required by the person filling out the form (the taxpayer) to locally open a form on their computer for data entry. The viewer raises a cost barrier to the implementation of this forms processing application. Though it is fiscally reasonable for a business or organization (organization) to license a form design application from a vendor to implement the forms processing application, it is impractical to license the viewer for the numerous remotely located customers or clients of the organization. In cases where a form is made available to the general public (government forms), the government would need to pay for a viewer license fee for every citizen who might access the form. This is impractical. The numbers involved are too great making the costs exorbitant. Furthermore, the majority of the benefit of electronically processed form-based transactions is realized by the organization. For this reason, it is not realistic to expect that remote form users will pay a license fee for an enhanced viewer.

However, there does exist a legitimate business method where viewers can effectively be provided to an organization's client or customer base without the huge cost detriment involved with licensing those viewers. Under this business method, a vendor that owns a page description language (PDL) application that creates and converts forms to PDL may want to freely distribute viewers that read the PDL in an effort to increase sales of the PDL application. For example, this method is practiced by Adobe, Inc.'s (Adobe's) ACROBAT. With ACROBAT, a user can convert documents composed in a variety of formats into the Adobe's proprietary PDL, "Portable Document Format" or PDF. Adobe has another application called ACROBAT READER that allows an end-user to view and print the PDF document. ACROBAT READER is made freely available to the public. Through this practice, Adobe has made PDF documents the de facto format for portable documents. An end user can view any document if the original user creates or converts the document to PDF. If an end-user wants to take advantage of certain enhanced functionality (i.e., digital signature) at their remote location, the end-user would need to use ACROBAT. ACROBAT is not freely distributed to end-users. Licenses of this product must be purchased. What is needed is a method and system for allowing the free deployment of viewer software that, when presented with a document having certain necessary criteria (such as an embedded activation key), unlocks certain inherent features in the viewer that provide enhanced functionality.

SUMMARY

The present invention provides a solution to this problem that involves remotely activating enhanced functionality in the end-users application (e.g., the viewer). In this fashion, it is possible to implement an increased licensing cost for those organizations that wish to use enhanced functionality features. When enhanced functionality is needed by the organization, it can be imparted to a specific document. Viewers capable of carrying out the capabilities of the enhanced functionality can be freely distributed since those features can be made functional by organizations who distribute forms and who are willing to pay the added costs on behalf of their users in order to obtain the significant automation benefits. Tracking devices can be placed in a network to track document use for per document licensing schemes.

In the forms processing application, the digital signature capability is activated within the viewer. The viewer possesses the inherent capability to perform digital signatures, but only through activation and while the electronic form was active in the viewer. Activation is made possible by including in an electronic form developed with the form design application, form-specific data that controls activation of the value-added features for the given document. The data is embedded in the electronic form file and is accessed remotely by the viewer to determine what, if any, enhanced functionality features should be activated. A form design application capable of imparting enhanced functionality and embedding such functionality in the electronic form is utilized. Furthermore, by embedding form-specific and organization-specific identification information, licensing schemes can be established based on electronic form use.

A method and system for remote activation of enhanced functionality features in locally created documents comprise a base software application including an electronic document design application for creating electronic documents, a delivery mechanism included in the electronic document design application for imparting document features to the electronic document, a viewing application for viewing the electronic documents created by the electronic document creation application and carrying out the document features imparted to the electronic document by the delivery mechanism, a binary string generator for generating an activation key, the sequence of which is based on the document features imparted to the electronic document, a processor for reading the activation key upon loading the electronic document into the viewing application to determine which document features were imparted to the electronic document and activating the capabilities corresponding to those document features in the electronic document viewing application. The system also includes processing instructions for reading the activation key when an electronic document is put in focus and processing instructions for deactivating all document features when an electronic document is removed from focus. The system further includes a network server for transmission of the electronic document from a first node to a second node, license and document identification information embedded in the electronic document, a counter located at the network server for counting the transmissions to and from the network server and a means for reading the counter for assessing licensing fees. The document features may be enhanced functionality features that add value-added benefits to the electronic document that are atypical for such documents.

In one aspect of the invention, there is a system for remotely activating document features in locally created electronic documents, the system comprising a. an electronic document design application for creating an electronic document on a local computer; b. means for entering document features to the electronic document; c. means for generating an activation key correlating to the document features entered to the electronic document and embedding the activation key into the electronic document; d. means for delivering the electronic document to a remote computer through an electronic network; e. means for receiving the electronic document at the remote computer; f. a viewer application located on the remote computer for opening the electronic document, the viewer application having functionalities for carrying out document features, the functionalities being selectively unlocked in response to an activation key corresponding to the entered document features; and g. means for reading the activation key in the electronic document and unlocking the document features in correlation to the activation key.

In another aspect of the invention, there is a method of remotely activating document features in a locally created electronic document, the method comprising a. creating an electronic document at a local computer using an electronic document design application, b. entering document features to the electronic document using the functionality of the electronic document design application, c. generating an activation key in relation to the document features entered to the electronic document, d. embedding the activation key in the electronic document, e. delivering the electronic document to a remote computer, f. receiving the electronic document at the remote computer, g. opening the electronic document in a viewer application having functionality for carrying out document features, h. reading the activation key in the electronic document, and i. unlocking selected document features in response to the activation key.

In another aspect of the invention, there is a system for determining license fees for network based transactions, the system comprising a. a network server having memory, b. a plurality of transaction files residing in the memory of the network server, c. a unique organization code taken from a plurality of organization codes and embedded in at least one transaction file, each of the plurality of organization codes corresponding to a unique organization, d. a computer, e. means for placing a request from the computer to the network server for download of the at least one transaction file from the network server to the computer, f. means for reading the unique organization code each time the at least one transaction file is downloaded from the network server to the computer, g. means for counting the number of times the unique organization code is read, and h. means for calculating a license fee for an organization in response to the number of times the unique organization code is read.

In another aspect of the invention, there is a system for determining license fees for network based transactions, the system comprising a network server having a memory, a plurality of transaction files residing in the memory of the network server, a unique organization code taken from a plurality of organization codes and embedded in at least one transaction file, each of the plurality of organization codes corresponding to a unique organization, a plurality of computers, a communication module operating on one of the computers and configured to place a request from the one computer to the network server for download of the at least one transaction file from the network server to the one computer, and a tracking module operating on the network server and configured to read the unique organization code each time the at least one transaction file is downloaded from the network server to the one computer, count the number of times the unique organization code is read, and calculate a license fee for an organization in response to the number of times the unique organization code is read.

In another aspect of the invention, there is a computer-readable medium containing instructions for remotely activating document features in a locally created electronic document, by entering document features to an electronic document using the functionality of an electronic document design application, generating an activation key in relation to the document features entered to the electronic document, embedding the activation key in the electronic document, delivering the electronic document to a remote computer, receiving the electronic document at the remote computer, opening the electronic document in a viewer application having functionality for carrying out document features, reading the activation key in the electronic document, and unlocking selected document features in response to the activation key.

In another aspect of the invention, there is a program storage device readable by a machine, tangibly embodying a program of instructions executable by the machine to perform a method of remotely activating document features in a locally created electronic document, the method comprising entering document features to an electronic document using the functionality of an electronic document design application, generating an activation key in relation to the document features entered to the electronic document, embedding the activation key in the electronic document, delivering the electronic document to a remote computer, receiving the electronic document at the remote computer, opening the electronic document in a viewer application having functionality for carrying out document features, reading the activation key in the electronic document, and unlocking selected document features in response to the activation key.

In another aspect of the invention, there is a computer-readable medium containing instructions for determining license fees for network based transactions, by placing a request from a computer to a network server for download of at least one transaction file from the network server to the computer, reading a unique organization code each time the at least one transaction file is downloaded from the network server to the computer, wherein the unique organization code is selected from a plurality of organization codes and is embedded in at least one transaction file, and wherein each of the plurality of organization codes corresponds to a unique organization, counting the number of times the unique organization code is read, and calculating a license fee for an organization in response to the number of times the unique organization code is read.

In yet another aspect of the invention, there is a program storage device readable by a machine, tangibly embodying a program of instructions executable by the machine to perform a method of determining license fees for network based transactions, the method comprising embedding a unique organization code selected from a plurality of organization codes into at least one transaction file, wherein each of the plurality of organization codes corresponds to a unique organization, placing a request from a computer to a network server for download of the at least one transaction file from the network server to the computer, reading the unique organization code each time the at least one transaction file is downloaded from the network server to the computer, counting the number of times the unique organization code is read, and calculating a license fee for an organization in response to the number of times the unique organization code is read.

BRIEF DESCRIPTION OF THE DRAWINGS

FIG. 5 is a flowchart of one embodiment of a process performed by the viewer shown in FIGS. 1 and 4.

FIG. 6 is a diagram of a sequence of two exemplary string representations for a first form being in focus and then a second form being in focus.

DETAILED DESCRIPTION

Figure 1:
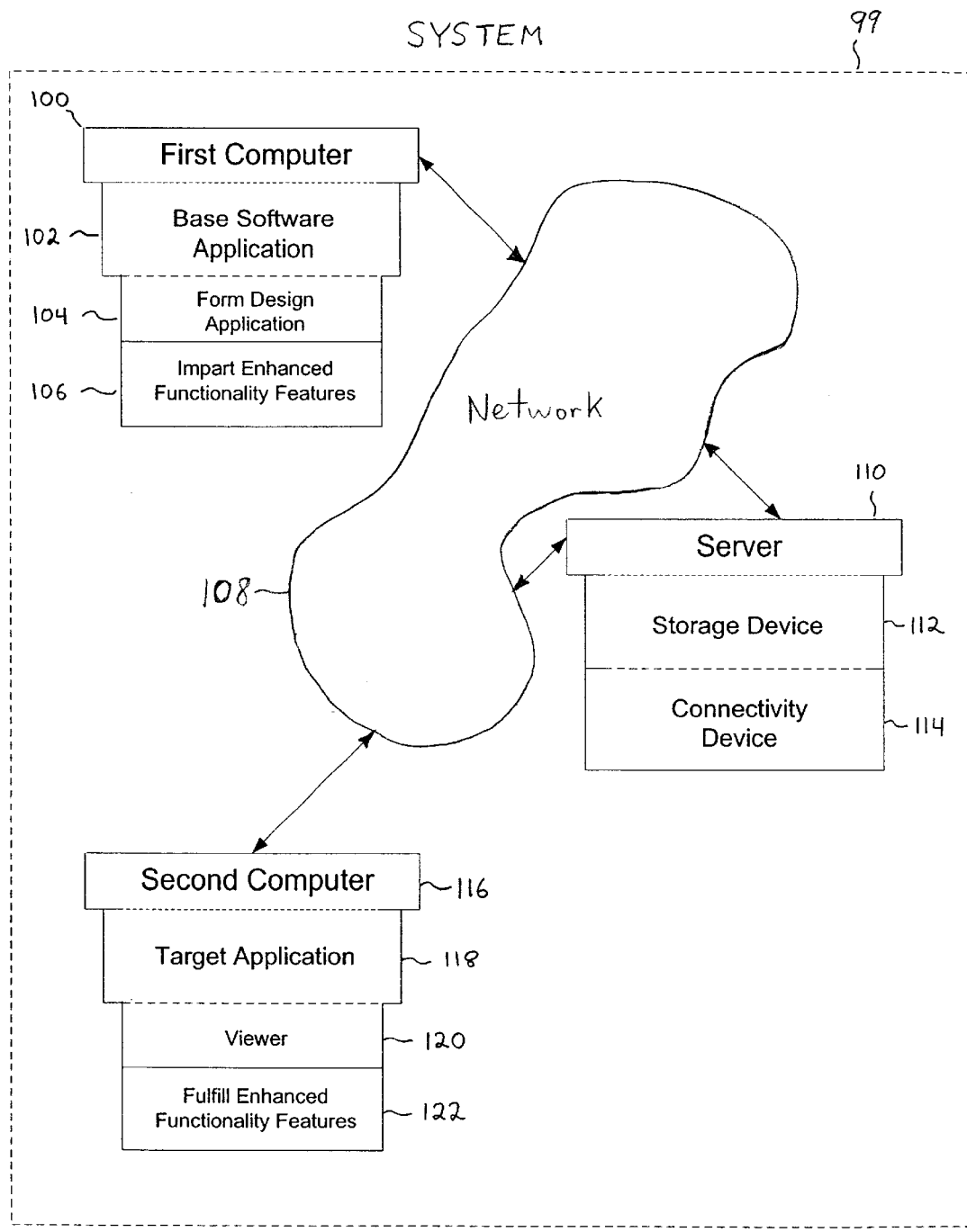
FIG. 1 is a block diagram of a configuration of components for one embodiment of the present invention.

The following detailed description of certain embodiments presents various descriptions of specific embodiments of the present invention. However, the present invention can be embodied in a multitude of different ways as defined and covered by the claims. In this description, reference is made to the drawings wherein like parts are designated with like numerals throughout.

Definitions

The following provides a number of useful possible definitions of terms used in describing certain embodiments of the present invention.

A network may refer to a network or combination of networks spanning any geographical area, such as a local area network, wide area network, regional network, national network, and/or global network. The Internet is an example of a current global computer network. Those terms may refer to hardwire networks, wireless networks, or a combination of hardwire and wireless networks. Hardwire networks may include, for example, fiber optic lines, cable lines, ISDN lines, copper lines, etc. Wireless networks may include, for example, cellular systems, personal communication services (PCS) systems, satellite communication systems, packet radio systems, and mobile broadband systems. A cellular system may use, for example, code division multiple access (CDMA), time division multiple access (TDMA), personal digital phone (PDC), Global System Mobile (GSM), or frequency division multiple access (FDMA), among others.

A computer or computing device may be any processor controlled device that permits access to the network, including terminal devices, such as personal computers, workstations, servers, clients, mini-computers, main-frame computers, laptop computers, a network of individual computers, mobile computers, palm-top computers, hand-held computers, set top boxes for a television, other types of web-enabled televisions, interactive kiosks, personal digital assistants, interactive or web-enabled wireless communications devices, mobile web browsers, or a combination thereof. The computers may further possess one or more input devices such as a keyboard, mouse, touch pad, joystick, pen-input-pad, and the like. The computers may also possess an output device, such as a visual display and an audio output. One or more of these computing devices may form a computing environment.

These computers may be uni-processor or multi-processor machines. Additionally, these computers may include an addressable storage medium or computer accessible medium, such as random access memory (RAM), an electronically erasable programmable read-only memory (EEPROM), programmable read-only memory (PROM), erasable programmable read-only memory (EPROM), hard disks, floppy disks, laser disk players, digital video devices, compact disks, video tapes, audio tapes, magnetic recording tracks, electronic networks, and other techniques to transmit or store electronic content such as, by way of example, programs and data. In one embodiment, the computers are equipped with a network communication device such as a network interface card, a modem, or other network connection device suitable for connecting to the communication network. Furthermore, the computers execute an appropriate operating system such as Linux, Unix, a version of Microsoft Windows, Apple MacOS, IBM OS/2, or other operating system. The appropriate operating system may include a communications protocol implementation that handles incoming and outgoing message traffic passed over the network. In other embodiments, while the operating system may differ depending on the type of computer, the operating system will continue to provide the appropriate communications protocols to establish communication links with the network.

The computers may contain program logic, or other substrate configuration representing data and instructions, which cause the computer to operate in a specific and predefined manner, as described herein. In one embodiment, the program logic may be implemented as one or more object frameworks or modules. These modules may be configured to reside on the addressable storage medium and configured to execute on one or more processors. The modules include, but are not limited to, software or hardware components that perform certain tasks. Thus, a module may include, by way of example, components, such as, software components, object-oriented software components, class components and task components, processes, functions, attributes, procedures, subroutines, segments of program code, drivers, firmware, microcode, circuitry, data, databases, data structures, tables, arrays, and variables.

The various components of the system may communicate with each other and other components comprising the respective computers through mechanisms such as, by way of example, interprocess communication, remote procedure call, distributed object interfaces, and other various program interfaces. Furthermore, the functionality provided for in the components, modules, and databases may be combined into fewer components, modules, or databases or further separated into additional components, modules, or databases. Additionally, the components, modules, and databases may be implemented to execute on one or more computers.

General Overview

The present invention operates in conjunction with a network-based computer system, such as the Internet. Embodiments of the present invention are applied to a forms processing application. The forms processing application used in one embodiment creates electronic forms having a plurality of data fields with a form design application. The electronic form is delivered to a user over a network system for entering data thereto. The user opens the electronic form using an application capable of viewing the form and entering data to the data fields. Data is entered to the fields and once complete, the electronic form is submitted over the network system to a specified network destination. Other applications, not relevant to this invention, extract the data from the data fields and store the data in memory for backend use. FIG. 1 depicts the major components of the system in the context of a forms processing application.

Referring to FIG. 1, a system 99 includes a first computer 100 or computing environment having a base software application 102. The base software application 102, generally, is used to design electronic documents with an electronic document design application. In one embodiment, the electronic document design application is a form design application 104. The base software application also includes the ability to impart certain document features, referred to as enhanced functionality features 106, to an electronic form. Enhanced functionality features are added value items such as digital signature capability, the ability to view a form in high fidelity, and local saving of the form with associated form data. Other functions and features known in the forms processing art may also be included in the base software application 102. The system 99 further includes a network 108 in communication with a server 110, a storage device 112 and a connectivity device 114 for transmission of files to and from the server. The network 108 is in communication with the first computer 100. A second computer 116 having a target application 118 also connects to the server 110 via the network 108 and connectivity device 114. The target application 118 includes a viewer 120, which possesses the ability to view the electronic form documents produced by the form design application 104 and to carry out the enhanced functionality features 122 imparted to the electronic form by the base software application 102. For convenience, the target application 118 may be referred to hereinafter as the viewer 120. Therefore, the viewer 120 allows the user to enter a digital signature to the electronic: form, view the electronic form in high fidelity and/or perform a local save of the form with associated form data to the local memory of the second computer.

The server 110, the first computer 100 and the second computer 116 may each have any conventional general purpose single- or multi-chip microprocessor, for example a Pentium processor, a Xenon processor, an Athlon processor, a MIPS processor, a Power PC processor, an ALPHA processor, or other general purpose processors. In addition, the microprocessor may be any conventional special purpose microprocessor such as a digital signal processor or a graphics processor. Additionally, the server 110, the first computer 100 and the second computer 116 may be a desktop, server, portable, hand-held, set-top, or other desired type of computing device. Furthermore, the server 110, the first computer 100 and the second computer 116 each may be used in connection with various operating systems, including, for example, UNIX, LINUX, Disk Operating System (DOS), VxWorks, PalmOS, OS/2, Mac OS, a version of Microsoft Windows, or other operating system. The server 110, the first computer 100 and the second computer 116 may each include a network terminal equipped with a video display, keyboard and pointing device.

Although FIG. 1 shows one second computer 116, the system configuration 99 may include any number of second computers. The network 108 can be any type of electronic transmission medium, for example, including but not limited to the following networks: a virtual private network, a public Internet, a private Internet, a secure Internet, a private network, a public network, a value-added network, an intranet, or a wireless gateway. The term "virtual private network" refers to a secure and encrypted communications link between nodes on the Internet, a Wide Area Network (WAN), Intranet, or any other network transmission means. In addition, connectivity to the network 108 may be via, for example, a modem, Ethernet (IEEE 802.3), Token Ring (IEEE 802.5), Fiber Distributed Datalink Interface (FDDI), Asynchronous Transfer Mode (ATM), Wireless Application Protocol (WAP), or other form of network connectivity. The second computer 116 may connect to the network 108 by use of a modem, a network interface card, or other mechanism.

Base Software Application

Figure 2:
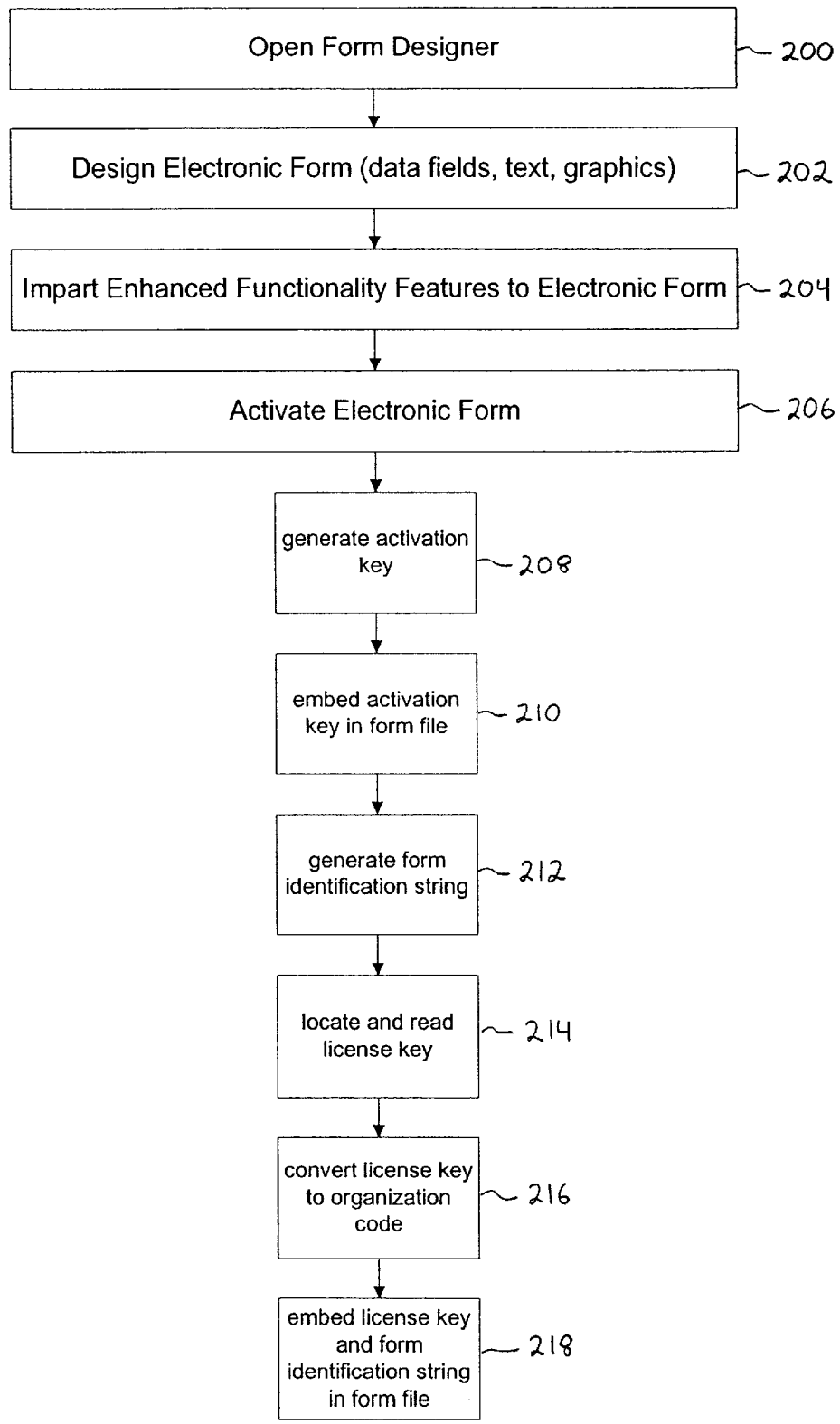
FIG. 2 is a flowchart of one embodiment of a process performed by the base software application shown in FIG. 1.

The general flow of the base software application 102 (FIG. 1) is depicted in FIG. 2. The form design application 104 is opened at state 200 and a nascent electronic form is designed at state 202. Design of the nascent electronic form includes at its most basic level the inclusion of data fields. Other features known in the art, such as graphic images and text, may also be included within the nascent electronic form. A nascent electronic form refers to an electronic form in its pre-activated state. When form design is completed, an activation process follows. The activation process results in turning many of the editable features of the nascent electronic form, such as the graphics and text, into background, e.g., a view only state, while triggering the inherent ability of the data fields to accept data input when opened in a viewer. Prior to the activation process, while the electronic form remains a nascent electronic form, the objects, i.e., graphics, text and data fields, remain editable.

The user of the form design application 104 imparts enhanced functionality features at state 204 to the nascent electronic form document. These features are imparted through menu driven controls and processing derived from the base software application or through other mechanisms known in the art. Enhanced functionality features provide value-added functionality to a post-activated electronic form document.

Figure 3:
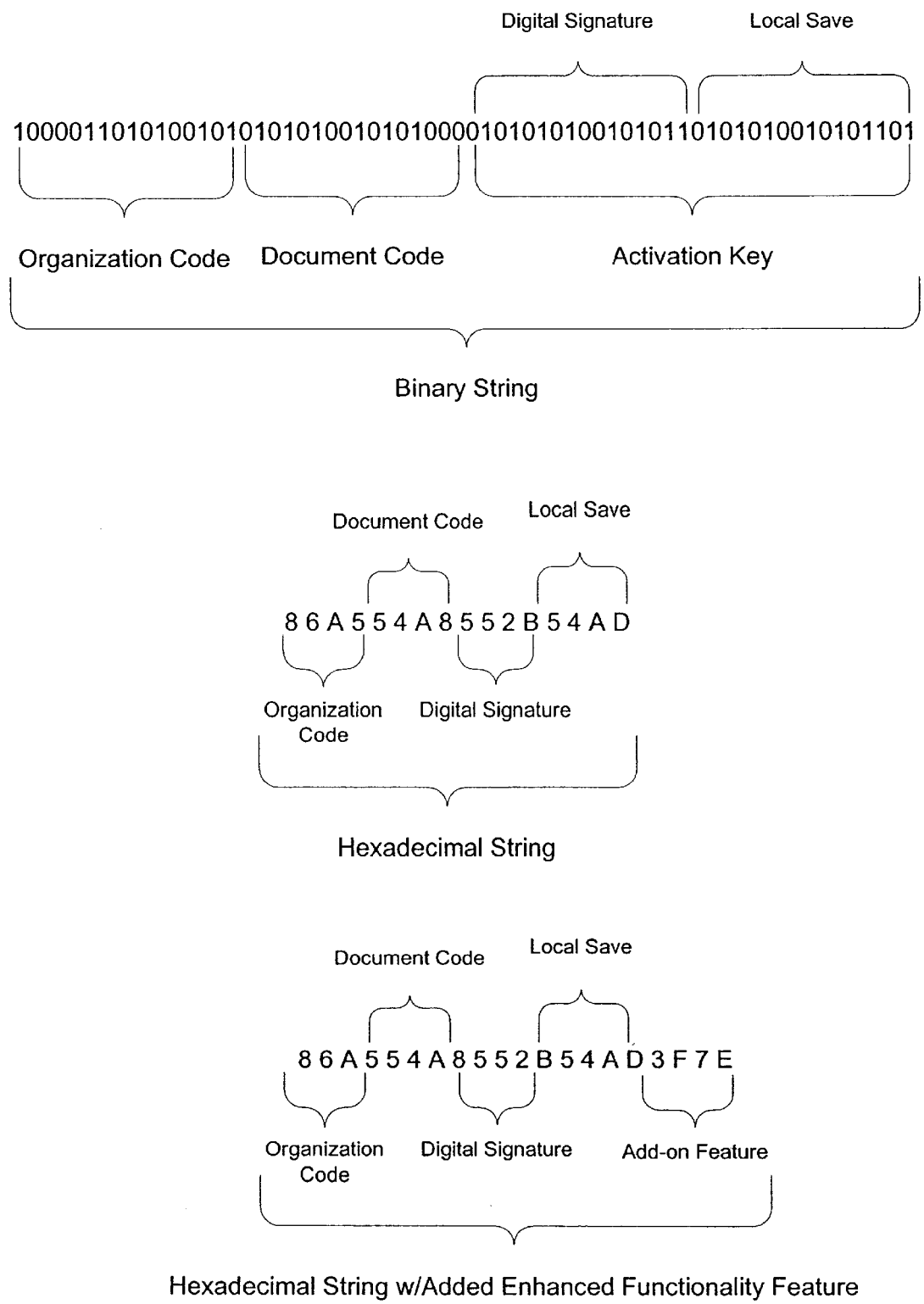
FIG. 3 is a diagram of three exemplary string representations showing an organization code, document code, and activation key as generated by the process shown in FIG. 2.

The nascent electronic form is activated at state 206 once form design is complete. All of the objects are rendered uneditable and the data fields are given the inherent ability to accept data input when the electronic form is opened in a compatible application. Activation also creates a chain of events related to the enhanced functionality features. Upon activation at state 206, a string generator generates an activation key at state 208. In one embodiment, the activation key (see FIG. 3) is a binary string of a predetermined length. Specified bit positions signify which particular enhanced functionality features have been imparted to the electronic form. For instance, bit position number two might correspond with digital signature functionality. A positive indication signifies that the ability to allow a remote user to access digital signature capabilities when this form is loaded into the target viewer has been imparted to the given electronic form. Furthermore, a combination of bit positions may signify the operability of a particular enhanced functionality feature, such as for example: bit position two— positive, bit position five—negative, bit position seven— positive. The combination being met can signify that ability to allow a remote user to access digital signature capabilities when this form is loaded into the target viewer has been imparted to the given electronic form. The base software application 102 defines the binary string sequences necessary to allow impartation of enhanced functionality features to the electronic form. The generated binary string is embedded in the electronic form file at state 210 where it resides as an added piece of information, adding length to the file but having no discernable effect. The binary string may also be tagged and embedded within a markup file.

In another embodiment of the invention, the string generator produces a hexadecimal string. The hexadecimal string facilitates encryption of the activation key. Through encryption, the sequences used to fulfill the enhanced functionality features at the viewer remain hidden and indeterminable. This will prevent others not having the base software application 102 from making use of the viewer's ability to activate enhanced functionality features.

In addition to generating the activation key, the string generator also generates document specific information to the electronic form file(s). This information is similarly generated in the form of a binary or hexadecimal string. The information provides a unique string identifying the subject electronic document and is referred to herein as the document code. Computer commands generate a document code at state 212 upon electronic form activation. Furthermore, each licensee of the base software application is given a license key that resides in an application file. When the electronic form is activated, computer commands are initiated to locate and read the license key at state 214. The computer then converts the license key to a binary or hexadecimal string, referred to herein as the organization code at state 216. Both the generated document code and the organization code are embedded in the electronic form file at state 218 alongside the activation key.

Every electronic form may contain an organization code, a document code and an activation key embedded therein. In one embodiment, the organization code is a constant string for every electronic form created by the licensee. The document code is a unique, per-form variable, differing as a predictable but unique string for each electronic form activated by the base software application 102. Nevertheless, in one embodiment, the number of bit positions used for this string remains constant and both the organization code and document code are positioned to precede the activation key. When a reader seeks to read the string, the positions of the organization code and document code are set to ensure an accurate read. The organization code and document code are positioned to precede the activation key because the number of bit positions of the activation key is not necessarily constant. If additional enhanced functionality features are later included to the base software application, there may be a need to increase the string length of the activation key. If the organization code and/or document code were to succeed the activation key, an increase in the string length of the activation key would upset the positions of the license key and/or document code. By having the license key and document code precede the activation key, no changes need be made to computer commands that would read these strings. The addition of a new enhanced functionality feature adds string length to the activation key. The existing enhanced functionality features available through the base software application contain pre-set bit positions for their section of the activation key. Therefore, installing a new enhanced functionality feature to the base software application will not alter the current bit positions used to signify the impartation of a specific enhanced functionality feature because new length is added to the activation key string for new features. The bit(s) included in the added length are used to signify if the newly installed enhanced functionality feature is imparted to the subject electronic form. In one embodiment, the organization code, document code, and activation key are embedded in the electronic form file as one continuous string. Computer commands specify the meaning of each bit position. See FIG. 3 for a representation of exemplary binary and hexadecimal strings showing an organization code, document code and activation key.

Network System

The activated electronic form is made accessible to the general public or a selected group of persons. In one embodiment, accessibility is provided through a network-based system, such as the Internet. Such a system allows persons in communication with the network and having the appropriate permissions, to access files stored in memory on a network server. Referencing FIG. 4, a first computer 400, being in communication with a network server 402 through a network 410, transfers an electronic form 404 to the network server through communication mechanisms known in the art. A second computer 406, also in communication with the network server 402 through a communication module 420 and the network 410, accesses the electronic form and transfers it to its own local memory through communication mechanisms known in the art.

Access to the electronic file at the second computer 406 is initiated by entering a uniform resource locator (URL) manually in a network request or indirectly through activation of a hyperlink. The hyperlink may be found on the website of the entity wishing to disseminate the electronic form.

The activated electronic form may also be electronically delivered via E-mail to an E-mail program or mechanism 422 to intended recipients. The entity wishing to disseminate the form attaches the electronic form file to E-mail messages. A mass delivery of the E-mail messages is made over the network system to all of the intended recipients. Typical E-mail mechanisms known in the art are used for delivery.

Figure 4:
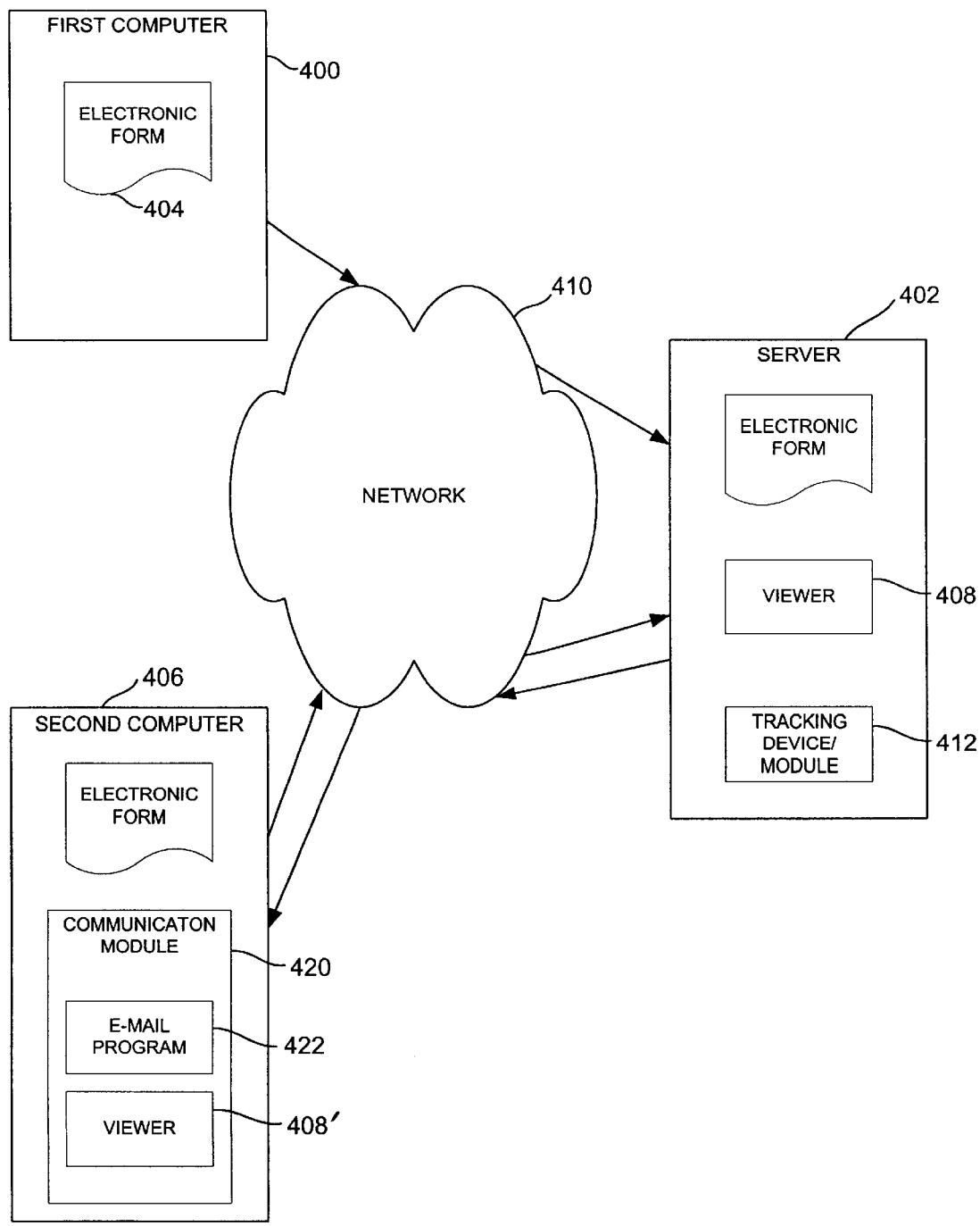
FIG. 4 is a block diagram of a configuration of components for another embodiment of the present invention including a tracking module.

Referencing FIG. 4, a viewer 408 is made similarly accessible to intended recipients of the electronic form. To view the electronic form and activate the enhanced functionality features, the viewer is made available to the second computer 406 via the network 410. The URL specifying the location of the viewer 408 on the network server 402 is manually entered to access the server. Alternatively, a hyperlink is activated. Using either approach, the viewer is transferred into the memory of the second computer 406 through communication mechanisms known in the art. The viewer may also be E-mailed to the intended recipients in an E-mail attachment to an E-mail program 422 or stored on removable media and delivered through non-electronic channels. In one embodiment, a viewer 408' and the E-mail program 422 are part of a communication module 420 at the second computer 406.

A tracking module or device 412 resides on the network server 402. The tracking device 412 monitors the traffic of electronic forms. The tracking device 412 ensures that a licensee is complying with the terms of their license. This is necessary when licensing is based on document usage. For instance, the terms of a license may be 10,000 transfers for a given price. The 10,001$^{st}$ transfer would violate the terms of the license. Furthermore, the license fee could be based on the number of individual transfers. The license key (embodied as the organization code) and document code provide needed information to the tracking device 412 to ensure compliance or calculate royalty fees. The tracking device 412 reads the license key, thereby identifying the licensee and the form identification, and increments a corresponding counter. Thus, particular electronic forms for a specific licensee can be tracked at the server 402.

Viewer FIG. 5 depicts general processing of the viewer 408' (FIG. 4). The viewer is opened in the second computer 406 at state 500. An electronic form 404 is loaded into the viewer at state 502. Loading the electronic form 404 prompts the viewer 408' to place the subject electronic form in focus or select the form for processing at state 504, which allows the functionality of the viewer to be imparted to the subject electronic form. Therefore, such functions as entering data to the data fields can occur. Loading the electronic form also prompts a reading of the activation key embedded in the electronic form file. If the activation key was encrypted by the base software application 102 (FIG. 1), a decryption process is first performed. The activation key is read at state 506. Enhanced functionality features are activated at state 508 according to the indications of the activation key. As stated above, a positive indication in bit position number two might correspond with digital signature functionality. A positive indication signifies that the digital signature feature should be activated in the electronic form allowing the recipient to provide a digital signature. Furthermore, a combination of bit positions may need to be read in order to activate a particular enhanced functionality feature. Similar to the example given above, if bit position two is positive, bit position five is negative, and bit position seven is positive, then the enhanced functionality feature corresponding to that combination is activated. The viewer performs the processing necessary to read the activation key, accordingly, and activate those enhanced functionality features where positive indications or respective combination of positive indications exist.

The enhanced functionality features imparted to the electronic form document are document-specific. The viewer 408' only activates those features in electronic forms having an activation key with the positive indications necessary for activation. A second electronic form loaded into the viewer at state 510 sets off a chain of commands similar to those performed when the first electronic form was loaded. The second electronic form is selected for processing or is placed in focus at state 512. This removes the first electronic form from focus and disengages the activation key of the first form at state 514. The activation key embedded in the second electronic form file is read at state 516. Depending on the indications read in this binary string, certain enhanced functionality features are activated at state 518. One embodiment uses a dynamic reading of the activation key to ensure enhanced functionality features are activated on a form-specific basis. Thus, when two electronic forms are loaded into the viewer, the electronic form that is in focus will control the enhanced functionality features that become activated. Switching focus back to the first electronic form causes the activation key of the first electronic form to be read thereby activating those form-specific enhanced functionality features.

Various schemes can be configured for placing electronic forms in focus. For instance, if two electronic forms are loaded into the viewer, the unloading of one may automatically (through the commands of the viewer programming) place the other in focus. Furthermore, if three electronic forms are loaded in and one is removed from focus, a previously in focus electronic form may be placed in focus. Whatever programming configuration is used, it is an element of the invention that when no electronic forms are in focus, no enhanced functionality features will be activated in one embodiment. Thus, when the in focus command is nullified, a separate instruction may be given by the viewer to inactivate all enhanced functionality features. See FIG. 6 for a descriptive example of this effect.

In certain embodiments, viewers that do not possess the ability to carry out the enhanced functionality features imparted to the electronic form document by the base software application 102 (FIG. 1) are still capable of opening the electronic form document. This is true unless the format of the electronic form document is proprietary and available only to those users that have a viewer capable of opening the proprietary format. With a nonproprietary format, an existing activation key will have no affect on the ability of the viewer to open the electronic form document. If the activation key was placed in the electronic form document file(s) as added information, it is rendered ineffectual and ignored. Similarly, if the activation key was placed in the electronic form document file(s) between markup language tags, the viewer will not recognize the tags. This system of making the activation key functional only in viewers that possess the ability to carry out enhanced functionality features ensures that the form processing application can always be used for its basic purpose and not rendered unusable.

Exemplary System Applications

Remote activation of enhanced functionality features in locally created electronic forms facilitates network-based transactions. Two complementary products, a design application and a viewer, work in conjunction with each other. The design application imparts one or more document features in an electronic form and the viewer possesses the functionality to activate and implement the imparted features. An organization setting up a network-based transaction creates the electronic form including the desired document features, which may be features that impart enhanced functionality to a document, e.g., functionality that is atypical but provides an added value to the document. The design application may be purchased or licensed from a vendor of this type of software. The organization makes the viewer software freely available for download, installation and use by the organization's clients. Through this method, the organization can conduct network-based transactions without being required to purchase licenses of the enhanced viewer application for all potential users. Since there is no cost involved to the client, clients will readily download, install and use the viewer so that they can more efficiently conduct the transaction online. A limited use of the viewer can be ensured by the selective activation of enhanced functionality features through activation keys that are only functional while the electronic form document is active in the viewer. Embedded string identifiers placed in the file of the created electronic form allow per form or bulk licensing. A counter placed on the server is able to read the electronic forms passing through the server and associate them with a specific organization and form.

Conclusion

Specific blocks, sections, devices, functions and modules may have been set forth. However, a skilled technologist will realize that there are many ways to partition the system of the present invention, and that there are many parts, components, modules or functions that may be substituted for those listed above.

While the above detailed description has shown, described, and pointed out the fundamental novel features of the invention as applied to various embodiments, it will be understood that various omissions and substitutions and changes in the form and details of the system illustrated may be made by those skilled in the art, without departing from the intent of the invention.

What is claimed is:

1. A system for remotely activating document features in locally created electronic documents, the system comprising:
   a. an electronic document design application for creating an electronic document on a local computer;
   b. means for entering document features to the electronic document;
   c. means for generating an activation key correlating to the document features entered to the electronic document and embedding the activation key into the electronic document;
   d. means for delivering the electronic document to a remote computer through an electronic network;
   e. means for receiving the electronic document at the remote computer;
   f. a viewer application located on the remote computer for opening the electronic document, the viewer application having functionalities for carrying out document features, the functionalities being selectively unlocked in response to an activation key corresponding to the entered document features; and
   g. means for reading the activation key in the electronic document and unlocking the document features in correlation to the activation key.

2. The system of claim 1, wherein the document features are enhanced functionality features.

3. The system of claim 1, further comprising:
   h. means for generating a unique document code for the electronic document created by the electronic document design application and embedding the document code into the electronic document;
   i. a network server;
   j. means for delivering the electronic document from the local computer to the remote computer through the network server;
   k. means for reading the unique document code each time the electronic document passes from the network server to the remote computer; and
   l. means for counting the number of times the unique document code is read.

4. The system of claim 3, further comprising:
   m. means for locating a unique license code in the electronic design application and generating a unique organization code for the electronic document in response to the unique license code;
   n. means for reading the unique organization code each time the electronic document passes from the network server to the remote computer; and
   o. means for counting the number of times the unique organization code is read.

5. The system of claim 4, further comprising means for determining a license fee in response to the number of times the unique organization code is read.

6. The system of claim 4, further comprising means for determining a license fee in response to the number of times both the unique document code and unique organization code are read.

7. The system of claim 4, wherein the feature code, unique document code and unique organization code are binary data strings.

8. The system of claim 7, further comprising means for combining the feature code, unique document code and unique organization code to create one contiguous binary data string.

9. The system of claim 8, wherein the feature code succeeds the unique document code and unique organization code in the order of reading, whereby the addition of string length to the feature code in response to new document features added to the electronic document design application does not reposition binary string elements corresponding to the unique document code, unique organization code and existing document activation key.

10. The system of claim 1, wherein the functionalities are selectively unlocked only while the electronic document is in focus.

11. The system of claim 1, wherein the electronic document design application is a form design application.

12. A method of remotely activating document features in a locally created electronic document, the method comprising:
   a. creating an electronic document at a local computer using an electronic document design application;
   b. entering document features to the electronic document using the functionality of the electronic document design application;
   c. generating an activation key in relation to the document features entered to the electronic document;
   d. embedding the activation key in the electronic document;
   e. delivering the electronic document to a remote computer;
   f. receiving the electronic document at the remote computer;
   g. opening the electronic document in a viewer application having functionality for carrying out document features;
   h. reading the activation key in the electronic document; and
   i. unlocking selected document features in response to the activation key.

13. The method of claim 12, further comprising:
   j. generating a unique document code for the electronic document;

k. embedding the document code into the electronic document;
l. delivering the electronic document from the local computer to the remote computer through a network server;
m. reading the unique document code for each delivery from the network server to the remote computer; and
n. counting the number of times the unique document code is read.

14. The method of claim 13, further comprising:
o. locating a unique license code in the electronic design application;
p. generating a unique organization code for the electronic document in response to the unique license code;
q. reading the unique organization code each time the, electronic document passes from the network server to the remote computer; and
r. counting the number of times the unique organization code is read.

15. The method of claim 14, further comprising:
S. calculating a first license fee in response to the number of times the unique organization code is read; and
t. calculating a second license fee in response to the number of times both the unique document code and the unique organization code are read.

16. The method of claim 12, wherein the unlocking is performed only when the electronic document is in focus.

17. The method of claim 12, wherein the electronic document design application is a form design application.

18. A system for determining license fees for network based transactions, the system comprising:
a. a network server having memory;
b. a plurality of transaction files residing in the memory of the network server;
c. a unique organization code taken from a plurality of organization codes and embedded in at least one transaction file, each of the plurality of organization codes corresponding to a unique organization;
d. a computer;
e. means for placing a request from the computer to the network server for download of the at least one transaction file from the network server to the computer;
f. means for reading the unique organization code each time the at least one transaction file is downloaded from the network server to the computer;
g. means for counting the number of times the unique organization code is read; and
h. means for calculating a license fee for an organization in response to the number of times the unique organization code is read.

19. The system of claim 18, further comprising:
i. a unique document code embedded in each of the plurality of transaction files;
j. means for reading the unique document code each time the at least one transaction file is downloaded from the network server to the computer;
k. means for counting the number of times the unique document code is read; and
l. means for calculating the license fee for the organization in response to the number of times the unique document code is read.

20. A system for determining license fees for network based transactions, the system comprising:
a network server having a memory;
a plurality of transaction files residing in the memory of the network server;
a unique organization code taken from a plurality of organization codes and embedded in at least one transaction file, each of the plurality of organization codes corresponding to a unique organization;
a plurality of computers;
a communication module operating on one of the computers and configured to place a request from the one computer to the network server for download of the at least one transaction file from the network server to the one computer; and
a tracking module operating on the network server and configured to:
read the unique organization code each time the at least one transaction file is downloaded from the network server to the one computer,
count the number of times the unique organization code is read, and
calculate a license fee for an organization in response to the number of times the unique organization code is read.

21. The system of claim 20, further comprising a unique document code embedded in each of the plurality of transaction files.

22. The system of claim 21, wherein the tracking module is additionally configured to:
read the unique document code each time the at least one transaction file is downloaded from the network server to the computer,
count the number of times the unique document code is read, and
calculate the license fee for the organization in response to the number of times the unique document code is read.

23. A computer-readable medium containing instructions for remotely activating document features in a locally created electronic document, by:
entering document features to an electronic document using the functionality of an electronic document design application;
generating an activation key in relation to the document features entered to the electronic document;
embedding the activation key in the electronic document;
delivering the electronic document to a remote computer;
receiving the electronic document at the remote computer;
opening the electronic document in a viewer application having functionality for carrying out document features;
reading the activation key in the electronic document; and
unlocking selected document features in response to the activation key.

24. A program storage device readable by a machine, tangibly embodying a program of instructions executable by the machine to perform a method of remotely activating document features in a locally created electronic document, the method comprising:
entering document features to an electronic document using the functionality of an electronic document design application;
generating an activation key in relation to the document features entered to the electronic document;
embedding the activation key in the electronic document;
delivering the electronic document to a remote computer;

receiving the electronic document at the remote computer;

opening the electronic document in a viewer application having functionality for carrying out document features;

reading the activation key in the electronic document; and unlocking selected document features in response to the activation key.

25. A computer-readable medium containing instructions for determining license fees for network based transactions, by:

placing a request from a computer to a network server for download of at least one transaction file from the network server to the computer;

reading a unique organization code each time the at least one transaction file is downloaded from the network server to the computer, wherein the unique organization code is selected from a plurality of organization codes and is embedded in at least one transaction file, and wherein each of the plurality of organization codes corresponds to a unique organization;

counting the number of times the unique organization code is read; and calculating a license fee for an organization in response to the number of times the unique organization code is read.

26. A program storage device readable by a machine, tangibly embodying a program of instructions executable by the machine to perform a method of determining license fees for network based transactions, the method comprising:

embedding a unique organization code selected from a plurality of organization codes into at least one transaction file, wherein each of the plurality of organization codes corresponds to a unique organization;

placing a request from a computer to a network server for download of the at least one transaction file from the network server to the computer;

reading the unique organization code each time the at least one transaction file is downloaded from the network server to the computer;

counting the number of times the unique organization code is read; and calculating a license fee for an organization in response to the number of times the unique organization code is read.

* * * * *

UNITED STATES PATENT AND TRADEMARK OFFICE
CERTIFICATE OF CORRECTION

PATENT NO. : 6,832,349 B1
DATED : December 14, 2004
INVENTOR(S) : Mark W. Seamans It is certified that error appears in the above-identified patent and that said Letters Patent is hereby corrected as shown below:

Title page,
Item [57], ABSTRACT,
Line 3, delete the comma "," after "features".

Column 15,
Line 15, delete the comma "," after "time the".
Line 21, delete "S." and insert -- s. --.

Signed and Sealed this

Fourteenth Day of March, 2006

JON W. DUDAS
*Director of the United States Patent and Trademark Office*